United States Patent
Koga et al.

(10) Patent No.: US 10,622,802 B2
(45) Date of Patent: Apr. 14, 2020

(54) POWER RECEIVING APPARATUS AND CONTROL CIRCUIT THEREOF

(71) Applicant: ROHM CO., LTD., Ukyo-ku, Kyoto (JP)

(72) Inventors: Fuminori Koga, Kyoto (JP); Kenichi Motoki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 442 days.

(21) Appl. No.: 15/648,890

(22) Filed: Jul. 13, 2017

(65) Prior Publication Data

US 2018/0019585 A1 Jan. 18, 2018

(30) Foreign Application Priority Data

Jul. 13, 2016 (JP) .................................. 2016-138956

(51) Int. Cl.

| | |
|---|---|
| *H02H 3/16* | (2006.01) |
| *H02H 3/087* | (2006.01) |
| *H02H 7/26* | (2006.01) |
| *H02J 7/00* | (2006.01) |
| *H02J 1/00* | (2006.01) |
| *H02H 11/00* | (2006.01) |
| *H02H 1/00* | (2006.01) |

(52) U.S. Cl.
CPC ............ *H02H 3/16* (2013.01); *H02H 1/0007* (2013.01); *H02H 3/087* (2013.01); *H02H 7/26* (2013.01); *H02H 11/005* (2013.01); *H02J 1/00* (2013.01); *H02J 7/0029* (2013.01); *H02J 2007/0062* (2013.01)

(58) Field of Classification Search
CPC ............ H02H 3/087; H02H 3/16; H02H 7/26; H02H 9/005; H02J 7/0004; H02J 7/0011; H02J 7/0029; H02J 7/0031; H02J 2007/0039; H02J 2007/0062
See application file for complete search history.

(56) References Cited

U.S. PATENT DOCUMENTS

| | | | |
|---|---|---|---|
| 10,283,975 B1* | 5/2019 | Venkatasamy | ........ H02J 7/0021 |
| 2010/0259101 A1* | 10/2010 | Micallef | ................ G01D 21/00 307/26 |
| 2011/0128153 A1* | 6/2011 | Sims | ..................... G06F 1/3203 340/636.1 |

(Continued)

FOREIGN PATENT DOCUMENTS

| | | |
|---|---|---|
| JP | 2006060977 A | 3/2006 |
| JP | 2006304500 A | 11/2006 |
| JP | 2013198262 A | 9/2013 |

*Primary Examiner* — Thienvu V Tran
*Assistant Examiner* — Christopher J Clark
(74) *Attorney, Agent, or Firm* — Cantor Colburn LLP

(57) ABSTRACT

A power receiving apparatus receives a bus voltage from a power supply apparatus via a cable, and supplies the bus voltage to a load circuit. A power receiver side controller receives, as a power supply, a voltage $V_{ADP}$ of a bus line that is more toward a bus switch. The power receiver side controller is capable of communicating with a power supply side controller of the power supply apparatus. Furthermore, the power receiver side controller determines the voltage to be supplied based on a negotiation, and controls the bus switch. A short circuit detection circuit detects a short circuit of a bus line that is more toward the load circuit side than the bus switch.

20 Claims, 9 Drawing Sheets

(56) References Cited

U.S. PATENT DOCUMENTS

| | | | | |
|---|---|---|---|---|
| 2011/0242716 | A1* | 10/2011 | Ueta | H02H 3/087 361/79 |
| 2012/0023344 | A1* | 1/2012 | Miyanaga | G06F 13/4072 713/310 |
| 2013/0050880 | A1* | 2/2013 | Rozman | H02H 3/025 361/18 |
| 2014/0015476 | A1* | 1/2014 | Kondo | H02J 7/0029 320/107 |
| 2015/0130476 | A1* | 5/2015 | Takahashi | H02M 1/32 324/537 |
| 2015/0229119 | A1* | 8/2015 | Tao | H02H 3/16 361/91.1 |
| 2015/0263562 | A1* | 9/2015 | Kim | H02J 7/0065 320/136 |
| 2016/0105038 | A1* | 4/2016 | Chi | H02J 7/007 320/107 |
| 2016/0308452 | A1* | 10/2016 | Motoki | H02M 3/33576 |
| 2017/0187200 | A1* | 6/2017 | Somerville | H02J 7/0052 |
| 2017/0229892 | A1* | 8/2017 | Kobayashi | H01R 24/60 |
| 2017/0264204 | A1* | 9/2017 | Motoki | H02M 1/08 |
| 2017/0271897 | A1* | 9/2017 | Wen | H02H 7/18 |
| 2017/0279270 | A1* | 9/2017 | Motoki | H01B 11/02 |
| 2017/0366092 | A1* | 12/2017 | Langeslag | H02M 1/08 |
| 2018/0048166 | A1* | 2/2018 | Hsu | H02J 7/0029 |
| 2018/0054074 | A1* | 2/2018 | Guo | H02J 7/0052 |
| 2018/0088648 | A1* | 3/2018 | Otani | H02J 7/0052 |
| 2018/0183234 | A1* | 6/2018 | Morii | H02H 9/044 |
| 2018/0212435 | A1* | 7/2018 | Li | H02J 7/0073 |
| 2018/0224913 | A1* | 8/2018 | Kaestner | G06F 1/266 |
| 2018/0367045 | A1* | 12/2018 | Zhang | H02M 1/08 |

* cited by examiner

POWER RECEIVING APPARATUS AND CONTROL CIRCUIT THEREOF

CROSS-REFERENCE TO RELATED APPLICATIONS

The present invention claims priority under 35 U.S.C. § 119 to Japanese Patent Application No. 2016-138956 filed with the Japan Patent Office on Jul. 13, 2016, the entire content of which is hereby incorporated by reference.

BACKGROUND OF THE INVENTION

1. Field of the Invention

The present invention relates to a power supply technique for an electronic device.

2. Description of the Related Art

Battery-driven devices such as cellular phone terminals, smartphones, tablet terminals, laptop computers, and portable audio players each include a rechargeable secondary battery and a charger circuit that charges the secondary battery as built-in components. Known examples of such charger circuits include an arrangement that charges a secondary battery using a DC voltage (bus voltage $V_{BUS}$) supplied from an external circuit via a USB cable or otherwise a DC voltage from an external AC adapter.

At present, as a charger circuit mounted on a mobile device, charger circuits that is compatible with a specification which is referred to as the "USB Battery Charging Specification" (which will be referred to as the "BC specification" hereafter) have become mainstream. There are several kinds of USB hosts or USB chargers (which will collectively be referred to as a "USB power supply apparatus" hereafter). As the kinds of USB power supply apparatuses that conform to revision 1.2 of the BC specification, SDP (Standard Downstream Port), DCP (Dedicated Charging Port), and CDP (Charging Downstream Port) have been defined. The current (current capacity) that can be provided by a USB power supply apparatus is defined according to the kind of USB power supply apparatus. Specifically, DCP and CDP are defined to provide a current capacity of 1500 mA. Also, SDP is defined to provide a current capacity of 100 mA, 500 mA, or 900 mA, according to the USB version.

As a next-generation secondary battery charging method or system using USB, a specification which is referred to as the "USB Power Delivery Specification" (which will be referred to as the "USB-PD specification" hereafter) has been developed. The USB-PD specification allows the available power to be dramatically increased up to a maximum of 100 W, as compared with the BC standard, which provides a power capacity of 7.5 W. Specifically, the USB-PD specification allows a USB bus voltage that is higher than 5 V (specifically, 9 V, 12 V, 15 V, 20 V, etc.). Furthermore, the USB-PD specification allows a charging current that is greater than that defined by the BC specification (specifically, the PD specification allows a charging current of 2 A, 3 A, 5 A, etc.). The USB-PD specification is employed in the USB Type-C specification.

FIG. 1 is a block diagram showing a power supply system 100R investigated by the present inventor. The power supply system 100R conforms to the USB Type-C specification, and includes a power supply apparatus 200R and a power receiving apparatus 300R coupled via a USB cable 106. For example, the power supply apparatus 200R is mounted on an AC adapter 102, or otherwise, is mounted on an electronic device. The power receiving apparatus 300R is mounted on a battery-driven electronic device 400 such as a smartphone, tablet terminal, digital still camera, digital video camera, portable audio player, or the like.

The power supply apparatus 200R includes a power supply circuit 202, a power supply side PD controller (which will be referred to as the "power supply side controller" hereafter) 204, and a bus switch SW1. The USB cable 106 is detachably coupled to a receptacle 108 provided to the electronic device 400. It should be noted that such a receptacle 108 may be omitted. That is to say, charger adapters are known having a configuration in which the USB cable 106 and the AC adapter 102 are monolithically integrated.

The receptacle 108 includes a VBUS terminal configured to supply a bus voltage $V_{BUS}$, a GND terminal configured to supply a ground voltage $V_{GND}$, and a CC (Configuration Channel) port. The power supply circuit 202 generates the bus voltage $V_{BUS}$. The power supply circuit 202 may include an AC/DC converter that receives an AC voltage of 100 V from an unshown external power supply (e.g., a commercially available AC power supply), and that converts the AC voltage thus received into the bus voltage $V_{BUS}$ in the form of a DC voltage. The bus voltage $V_{BUS}$ generated by the power supply circuit 202 is supplied to the power receiving apparatus 300R via a bus line of the USB cable 106 and the bus switch SW1.

The power supply side controller 204 and a power receiver side controller 310 are each configured as a port controller that conforms to the USB Type-C specification. The power supply side controller 204 and the power receiver side controller 310 are coupled via a CC line, which provides a communication function between them. Negotiation is performed between the power supply side controller 204 and the power receiver side controller 310 with respect to the voltage level of the bus voltage $V_{BUS}$ to be supplied from the power supply apparatus 200R. The power supply side controller 204 controls the power supply circuit 202 so as to supply electric power with the voltage level thus determined, and controls on/off operations of the bus switch SW1.

The electronic device 400 includes a load (system) 402 in addition to the power receiving apparatus 300R. Examples of such a load circuit 402 include CPUs, memory, liquid crystal displays, audio circuits, and the like. The AC adapter 102 is detachably coupled to the receptacle 404 via the USB cable 106.

The power receiving apparatus 300R includes a battery 302, a charger circuit 304, the power receiver side controller 310, and a bus switch SW2.

The battery 302 is configured as a rechargeable secondary battery. The charger circuit 304 receives the bus voltage $V_{BUS}$ (which will also be referred to as the "adapter voltage $V_{ADP}$" on the power receiving apparatus 300R side) from the power supply apparatus 200R via the USB cable 106 and the bus switch SW2, so as to charge the battery 302. The charger circuit 304 is configured as a step-down DC/DC converter, a linear regulator, or a combination of such components.

A system voltage $V_{SYS}$ is supplied from the charger circuit 304 to the load circuit 402 according to at least one of the adapter voltage $V_{ADP}$ and the voltage $V_{BAT}$ supplied from the battery 302. Examples of such a load circuit 402 include power management ICs (Integrated Circuits), multi-channel power supplies each including a DC/DC converter, linear regulator or the like, microcomputers, liquid crystal displays, display drivers, and so forth.

The power receiver side controller 310 is coupled such that it operates using the adapter voltage $V_{ADP}$ as a power supply voltage. Accordingly, after the bus switch SW1 is turned on, the power receiver side controller 310 is able to operate. The power receiver side controller 310 holds data (request PDO: Power Data Object) that defines the maximum current and the bus voltage $V_{BUS}$ to be requested by the power receiving apparatus 300R. After the AC adapter 102 and the electronic device 400 are coupled, negotiation is performed between the power supply side controller 204 and the power receiver side controller 310. As a result, the voltage level of the bus voltage $V_{BUS}$ is determined based on the request PDO. Furthermore, the power receiver side controller 310 controls the on/off operations of the bus switch SW2.

FIG. 2 is an operation sequence diagram showing the operation of the power supply system 100 shown in FIG. 1. After the power supply apparatus 200R and the power receiving apparatus 300R are coupled via the USB cable 106, the power supply side controller 204 detects this coupling based on the state of the CC port (S100). Subsequently, the bus switch SW1 is turned on (S102). In this state, the power supply system 100 supplies the bus voltage $V_{BUS}$ of 5 V, which is a default value. After the bus switch SW1 is turned on, the power receiver side controller 310 enters the operable state.

Next, negotiation is performed between the power supply side controller 204 and the power receiver side controller 310, and the bus voltage $V_{BUS}$ is determined based on the requested voltage (S104). The power supply side controller 204 switches the bus voltage $V_{BUS}$ to the requested voltage from the initial voltage of 5 V. (S106).

After completing the switching of the bus voltage $V_{BUS}$ to the requested voltage, the power supply side controller 204 transmits a notice thereof to the power receiver side controller 310 (S108). The power receiver side controller 310 turns on the bus switch SW2 in response to the notice thus received (S110). As a result, the bus voltage $V_{BUS}$ is supplied to the charger circuit 304 and the load circuit 402 (S112).

If a short circuit occurs in the power supply system 100R, this leads to heat generation. Also, in some cases, this leads to degradation in the reliability of circuit elements due to overcurrent. Thus, it is important to provide a short circuit protection technique. As a result of investigating such short circuit protection to be employed in the power supply system 100R shown in FIG. 1, the present inventor has come to recognize the following problem.

Typically, the power supply circuit 202 has a short circuit protection (SCP) function for its output terminal. With the power supply system 100R shown in FIG. 1, the power supply circuit 202 provides an SCP function which allows the power supply system 100R to detect and protect against a short-circuit abnormality that can occur between the output of the power supply circuit 202 and the bus switch SW1 as indicated by (i) in the drawing (which will be referred to as the "first mode" in the present specification).

Referring to the sequence diagram shown in FIG. 2, the power supply circuit 202 is capable of detecting a short circuit that occurs in the output of the power supply circuit 202, before the bus switch SW1 is turned on (S102), and during the bus voltage $V_{BUS}$ of 5 V is generated. Accordingly, in this case, the power supply circuit 202 is capable of stopping its operation and of latching the operation state.

However, with the power supply system 100R shown in FIG. 1, the SCP function of the power supply circuit 202 does not enable detection and protection against a short circuit that can occur more toward the load circuit 402 side than the bus switch SW2 as indicated by (ii) in the drawing (which will be referred to as the "second mode" in the present specification).

Description will be made regarding the reason for this. Before the bus switch SW2 is turned on, the path of a short circuit in the second mode has no effect on the system. Accordingly, the operation proceeds normally up to Step S108 in the sequence diagram shown in FIG. 2.

After the bus switch SW2 on the power receiving apparatus 300R side is turned on, the adapter voltage $V_{ADP}$, i.e., the power supply voltage for the power receiver side controller 310, falls in the vicinity of zero, which shuts down the power receiver side controller 310. After the power receiver side controller 310 is shut down, the bus switch SW2 is turned off. Accordingly, the adapter voltage $V_{ADP}$ is restored to a value in the vicinity of the output voltage $V_{BUS}$ of the power supply circuit 202.

That is to say, as viewed from the power supply circuit 202 side, such an arrangement only has an opportunity to detect a short circuit that occurs in the output in a short period of time in which the bus switch SW2 is turned on. However, it is difficult for the SCP function of the power supply circuit 202 to detect a short circuit that occurs in the output in such a short period of time.

It should be noted that such a problem is not restricted to such an arrangement that conforms to the USB-PD specification. Also, such a problem can occur in power supply systems having a protocol that is similar to that of the USB-PD specification.

SUMMARY OF THE INVENTION

The present invention has been made in order to solve such a problem. Accordingly, it is an exemplary purpose of an embodiment of the present invention to provide a power supply system and a power supply apparatus that are capable of safely detecting a short circuit that can occur in a power receiving apparatus.

An embodiment of the present invention relates to a power receiving apparatus structured to receive a bus voltage from a power supply apparatus via a cable, and to supply the bus voltage to a load circuit. The power receiving apparatus comprises: a bus line structured to extend from a receptacle, into which the cable is to be inserted, to the load circuit; a bus switch arranged on a path of the bus line; a power receiver side controller structured to receive, as a power supply, a voltage on the bus line that is more toward the receptacle side than the bus switch, to communicate with a power supply side controller of the power supply apparatus, to determine a voltage to be supplied based on a negotiation, and to control the bus switch; and a short circuit detection circuit structured to detect a short circuit of the bus line that is more toward the load circuit side than the bus switch in an off state of the bus switch.

With such an embodiment, by operating the short circuit detection circuit before the bus switch is turned on, this allows an internal component of the power receiving apparatus to safely detect a short circuit without involving an effect on the power supply circuit on the power supply apparatus side.

Also, the short circuit detection circuit may be structured to be switchable between an on state and an off state. Also, the short circuit detection circuit may comprise a charger circuit structured to charge the bus line that is more toward the load circuit side than the bus switch in the on state. Also, the short circuit detection circuit may be structured to detect a short circuit based on the voltage on the bus line.

In the off state of the bus switch, the voltage on a bus line that is more toward the load circuit side than the bus switch is substantially zero. When there is no short circuit of the bus line that is more toward the load circuit side than the bus switch, the voltage on the bus line rises due to the charging operation of the charger circuit. Conversely, when there is a short circuit of the bus line, the voltage on the bus line remains at an electric potential of substantially zero regardless of the charging operation. Such an embodiment is capable of detecting a short circuit of the bus line that is more toward the load circuit side than the bus switch.

Also, the charger circuit may comprise a charging switch arranged on a sub-path arranged in parallel with the bus switch. Also, the charger circuit may have an impedance that is higher than that of the bus switch. By designing the charger circuit to have a high impedance, such an arrangement is capable of preventing a large amount of current from flowing in a case in which there is a short circuit.

Also, the charger circuit may further comprise a charging resistor arranged on the sub-path such that it is coupled in series with the charging switch. Such an arrangement is capable of limiting, according to the resistance value of the charging resistor, an amount of current that flows when there is a short circuit.

Also, the charging switch may be structured to have an impedance that is higher than that of the bus switch. This allows the charging switch to be used as an element that limits the amount of current that flows when there is a short circuit. Furthermore, this allows the charging switch to have a compact size.

Also, the charger circuit may comprise a current source. This allows the amount of current flow to be limited when there is a short circuit.

Also, the short circuit detection circuit may comprise a comparator structured to compare the voltage on the bus line with a predetermined threshold voltage. Also, the comparator may be built into a single chip together with the power receiver side controller.

Also, the power receiving apparatus may be structured to conform to the USB-PD specification.

Also, the power receiving apparatus may be structured to conform to the USB Type-C specification. Also, the power receiver side controller may be structured to set a pull-down resistor coupled to a CC (Configuration Channel) port to an open state when the short circuit detection circuit detects a short circuit. This cancels the USB Type-C port declaration. Accordingly, the power supply apparatus cancels USB Type-C recognition of the power receiving apparatus, thereby suspending the power supply operation.

Also, when the short circuit detection circuit detects a short circuit, the power receiver side controller may fix the bus switch to the off state. With such an arrangement, the power supply apparatus is disconnected from such a short-circuit portion by means of the bus switch in the off state. This allows the system to be maintained in a safe state even if the power supply apparatus continues to supply the bus voltage.

Another embodiment of the present invention relates to an electronic device. The electronic device may comprise any one of the aforementioned power receiving apparatuses.

Yet another embodiment of the present invention relates to a control circuit. The control circuit is employed in a power receiving apparatus structured to receive a bus voltage from a power supply apparatus via a cable, and to supply the bus voltage to a load circuit. In addition to the control circuit, the power receiving apparatus comprises: a bus line structured to extend from a receptacle, into which the cable is to be inserted, to the load circuit; a bus switch arranged on a path of the bus line; and a charger circuit structured to be switchable between an on state and an off state, and to charge the bus line that is more toward the load circuit side than the bus switch in the on state. The control circuit comprises: a communication circuit structured to communicate with a power supply side controller of the power supply apparatus; a logic circuit structured to determine a voltage to be supplied, based on a negotiation with the power supply side controller, and to control the bus switch; and a short circuit detection circuit structured to detect a short circuit of the bus line that is more toward the load circuit side than the bus switch in a state in which the logic circuit turns off the bus switch.

Also, the control circuit may be monolithically integrated on a single semiconductor substrate. Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By monolithically integrating the circuit on a single chip, such an arrangement allows the circuit area to be reduced, and allows the circuit elements to have uniform characteristics.

Also, the charger circuit may be further integrated on the same semiconductor substrate as the control circuit. This allows the number of circuit components to be further reduced.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is coupled to the member B" includes a state in which the member A is indirectly coupled to the member B via another member that does not substantially affect the electric connection therebetween, or that does not damage the functions or effects of the connection therebetween, in addition to a state in which the member A is physically and directly coupled to the member B.

Similarly, the state represented by the phrase "the member C is provided between the member A and the member B" includes a state in which the member A is indirectly coupled to the member C, or the member B is indirectly coupled to the member C via another member that does not substantially affect the electric connection therebetween, or that does not damage the functions or effects of the connection therebetween, in addition to a state in which the member A is directly coupled to the member C, or the member B is directly coupled to the member C.

Figure 3:
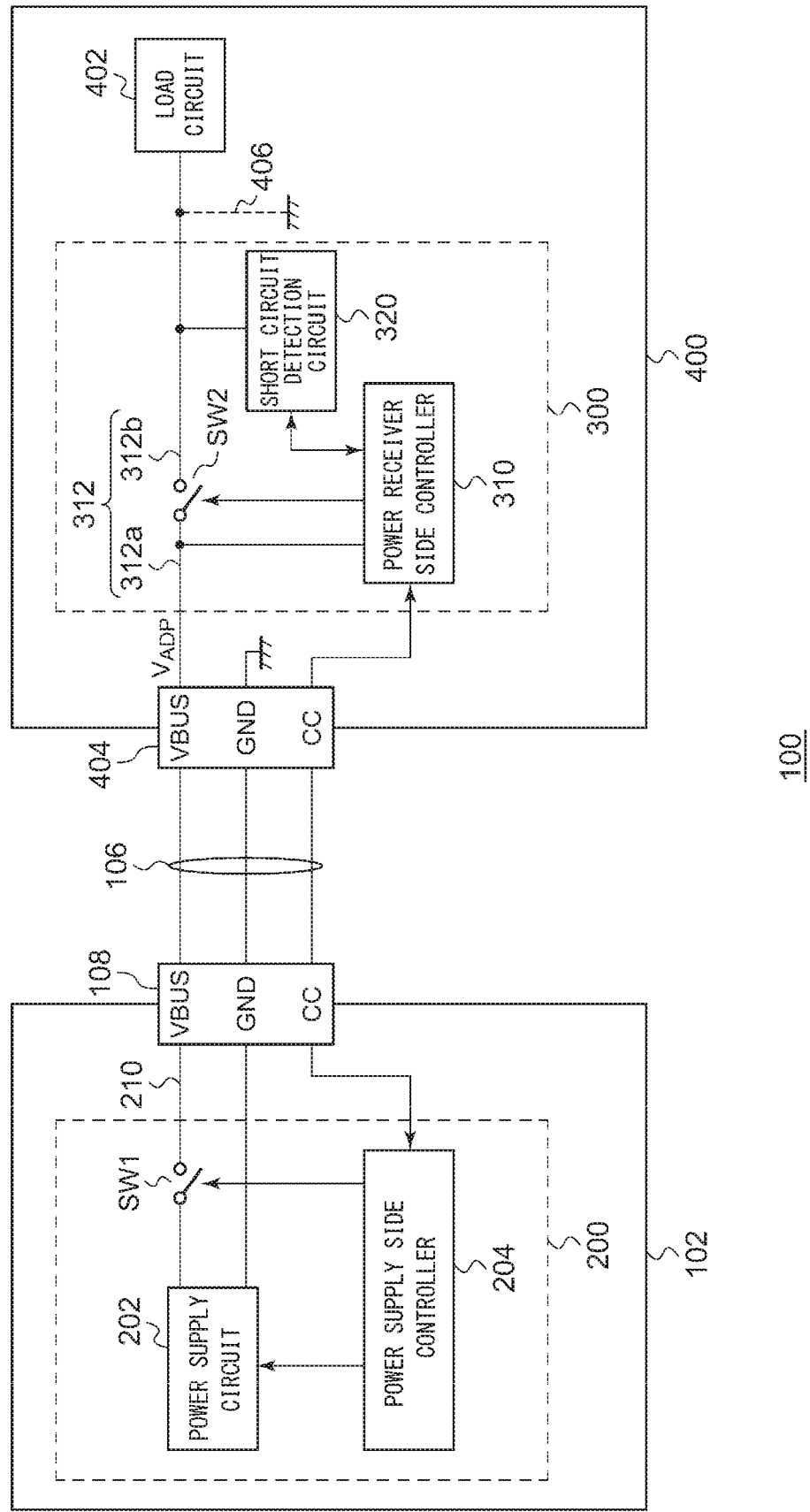
FIG. 3 is a block diagram showing a power supply system including a power receiving apparatus according to an embodiment.

FIG. 3 is a block diagram showing a power supply system 100 including a power receiving apparatus 300 according to an embodiment. The power supply system 100 includes a power supply apparatus 200 and a power receiving apparatus 300. In the present embodiment, the power supply system 100 conforms to the USB-PD specification, and in particular, to the USB Type-C specification. The power supply apparatus 200 and the power receiving apparatus 300 are coupled via a USB cable 106. The power supply apparatus 200 is built into the adapter 102. The power receiving apparatus 300 is built into an electronic device 400. The power supply apparatus 200 has the same configuration as that of the power supply apparatus 200r shown in FIG. 1.

Figure 1:
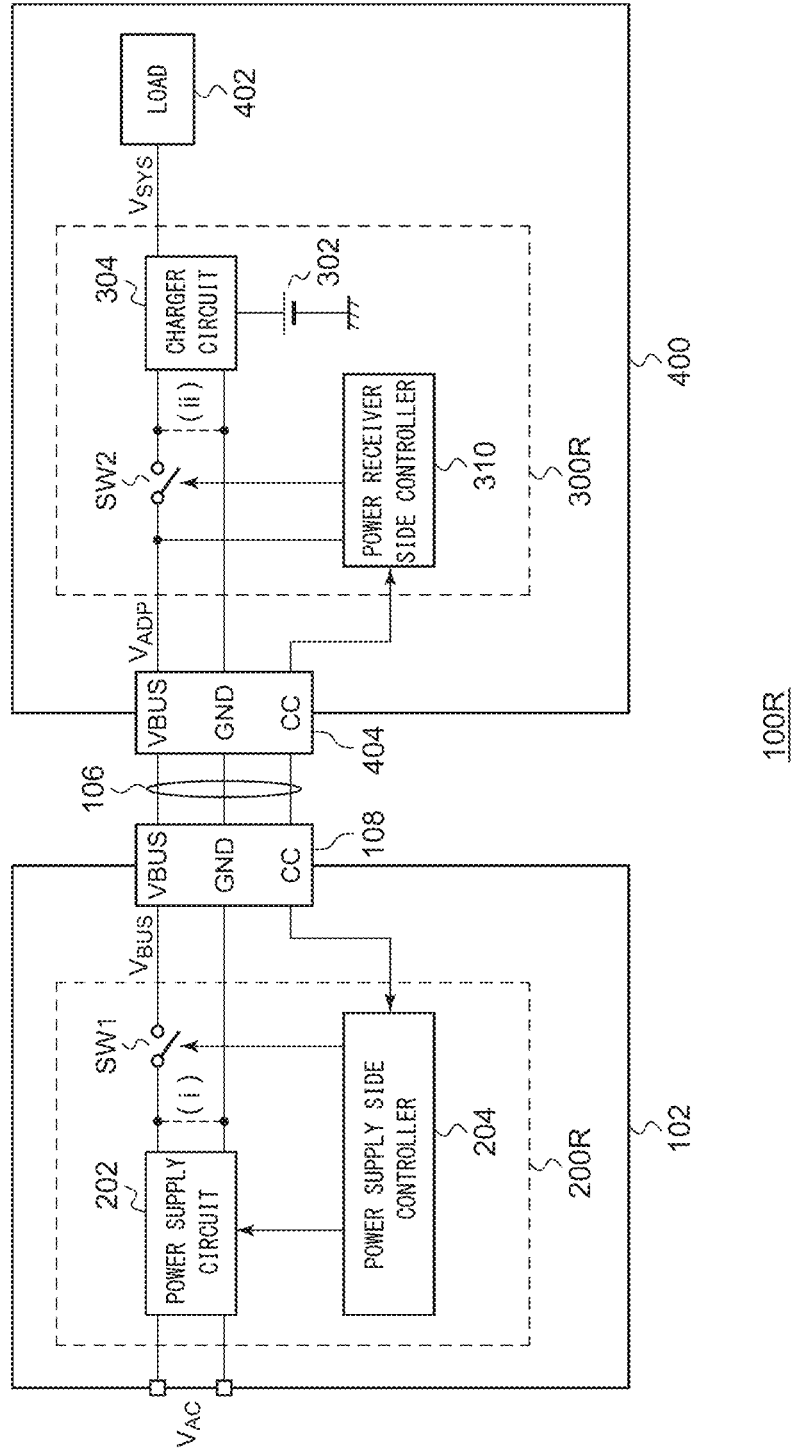
FIG. 1 is a block diagram showing a power supply system investigated by the present inventor.

The power receiving apparatus 300 receives the bus voltage $V_{BUS}$ from the power supply apparatus 200 via the USB cable 106, and supplies the bus voltage $V_{BUS}$ to a load circuit 402. It should be noted that description will be made in the embodiment regarding an arrangement in which the battery 302 and the charger circuit 304 shown in FIG. 1 are included in the load circuit 402, and are not shown.

A bus line 312 is arranged such that it extends from a receptacle 404 into which the USB cable 106 is to be inserted to the load circuit 402. A bus switch SW2 is arranged on a path of the bus line 312. A part of the bus line 312 that is more toward the receptacle 404 side than the bus switch SW2 will be referred to as the "first bus line 312a". The other part that is more toward the load circuit 402 side than the bus switch SW2 will be referred to as the "second bus line 312b".

The power receiver side controller 310 receives the voltage on the first bus line 312a (which will also be referred to as "adapter voltage $V_{ADP}$") as a power supply. The power receiver side controller 310 is configured to communicate with the power supply side controller 204 of the power supply apparatus 200. This allows negotiation for determining the voltage to be supplied. Furthermore, this allows the bus switch SW2 to be controlled.

In the off state of the bus switch SW2, a short circuit detection circuit 320 detects a short circuit 406 on the second bus line 312b which is more toward the load circuit 402 side than the bus switch SW2.

Figure 2:
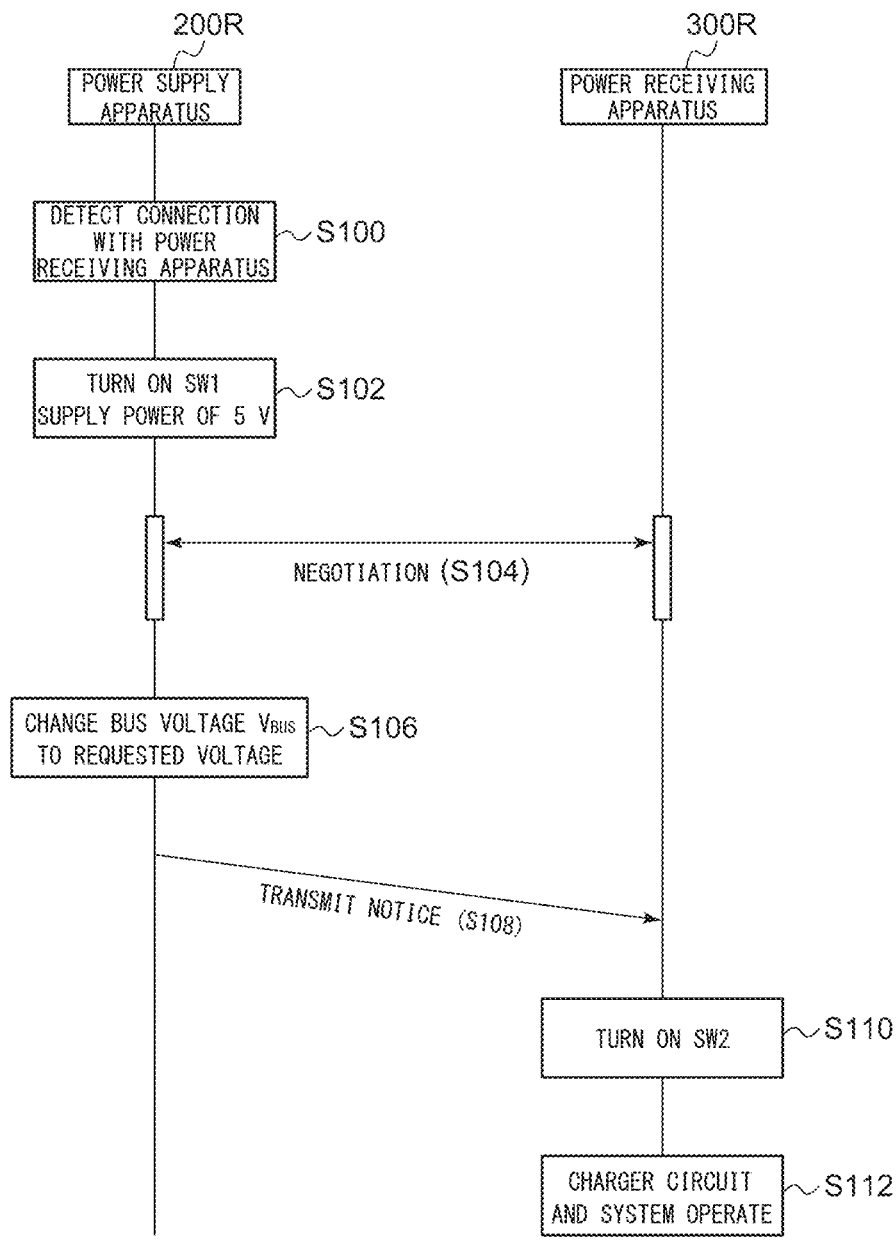
FIG. 2 is an operation sequence diagram showing the operation of the power supply system shown in FIG. 1.
Figure 4:
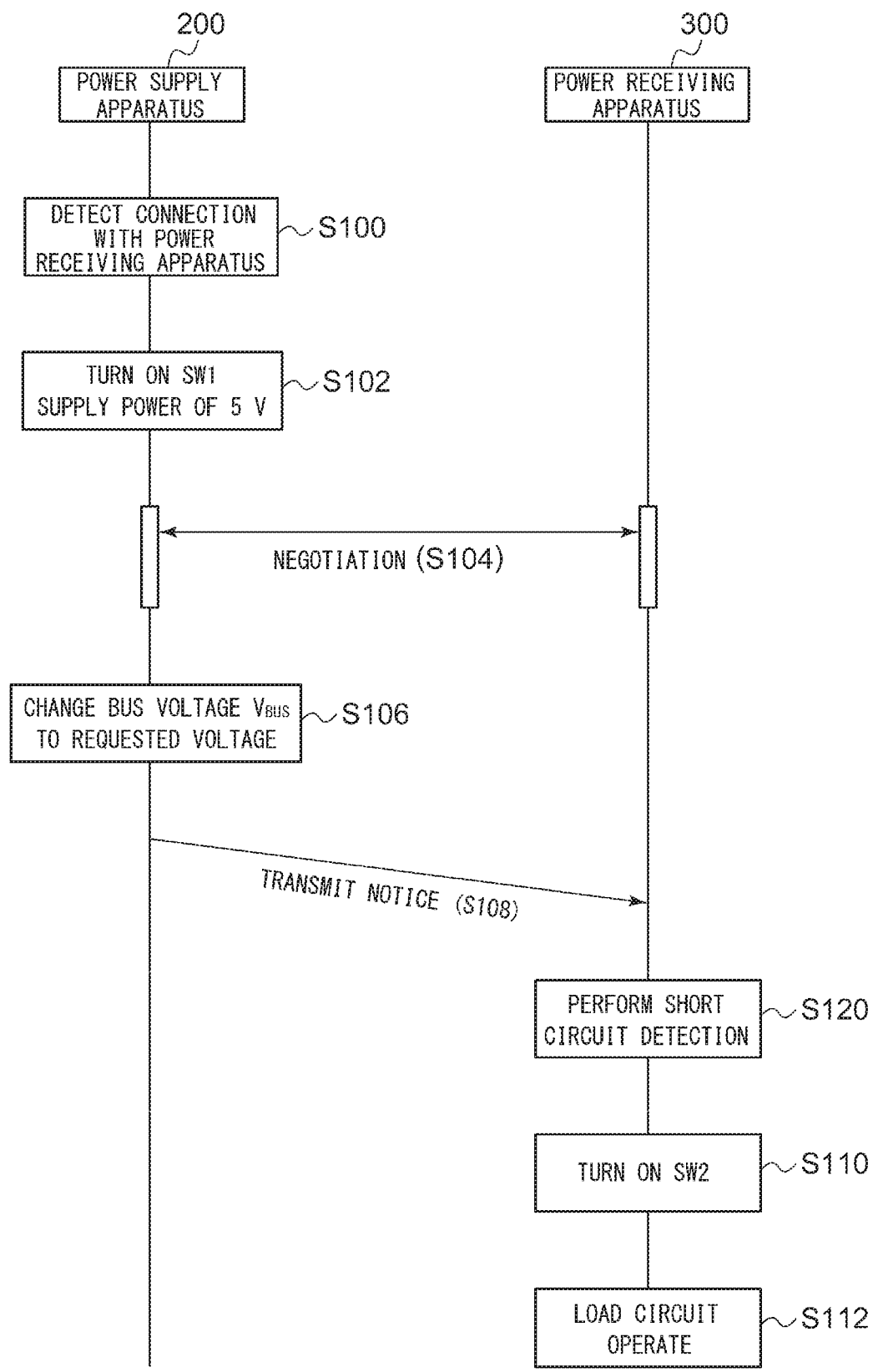
FIG. 4 is an operation sequence diagram showing the operation of the power supply system shown in FIG. 3.

The above is the configuration of the power receiving apparatus 300. Next, description will be made regarding the operation thereof. FIG. 4 is an operation sequence diagram showing the operation of the power supply system 100 shown in FIG. 3. The operations in Steps S100 through S108 are the same as those shown in FIG. 2.

In the present embodiment, in Step S108, after a notice of power supply completion is transmitted, the short circuit detection circuit 320 performs short circuit detection before the bus switch SW2 is turned on (S120). When a short circuit has not occurred, the bus switch SW2 is turned on (S110), and the load circuit 402 becomes operable (S112).

In Step S120, when a short circuit has been detected, an appropriate short circuit protection operation is performed.

For example, when a short circuit has been detected, the power receiving apparatus 300 fixes the bus switch SW2 to the off state. As a result, the bus switch SW2 in the off state disconnects the short circuit portion 406 from the power supply circuit 202 of the power supply circuit 200 even in a case in which the power supply of the bus voltage $V_{BUS}$ from the power supply apparatus 200 is continued. This allows the power supply system 100 to be maintained in a safe state.

Also, as described later, when a short circuit has been detected, the power receiving apparatus 300 may set a pull-down resistor Rd (not shown in FIG. 3) that is coupled to the CC port to the open state. As a result, the USB Type-C port declaration is canceled, and accordingly, because the power supply device 200 no longer recognizes the power receiving apparatus 300 as a USB Type-C device, the power supply can be quickly suspended.

Also, when a short circuit has been detected, the power receiver side controller 310 may use the communication via the CC line to notify the power supply side controller 204 of a short circuit on the load side. In response to this notice, the power supply side controller 204 may suspend the operation of the power supply circuit 202.

The present invention encompasses various kinds of apparatuses and circuits that can be regarded as a block configuration or a circuit configuration shown in FIG. 3, or otherwise that can be derived from the aforementioned description. That is to say, the present invention is not restricted to a specific configuration. More specific description will be made below regarding an example configuration for clarification and ease of understanding of the essence of the present invention and the circuit operation. That is to say, the following description will by no means be intended to restrict the technical scope of the present invention.

Figure 5:
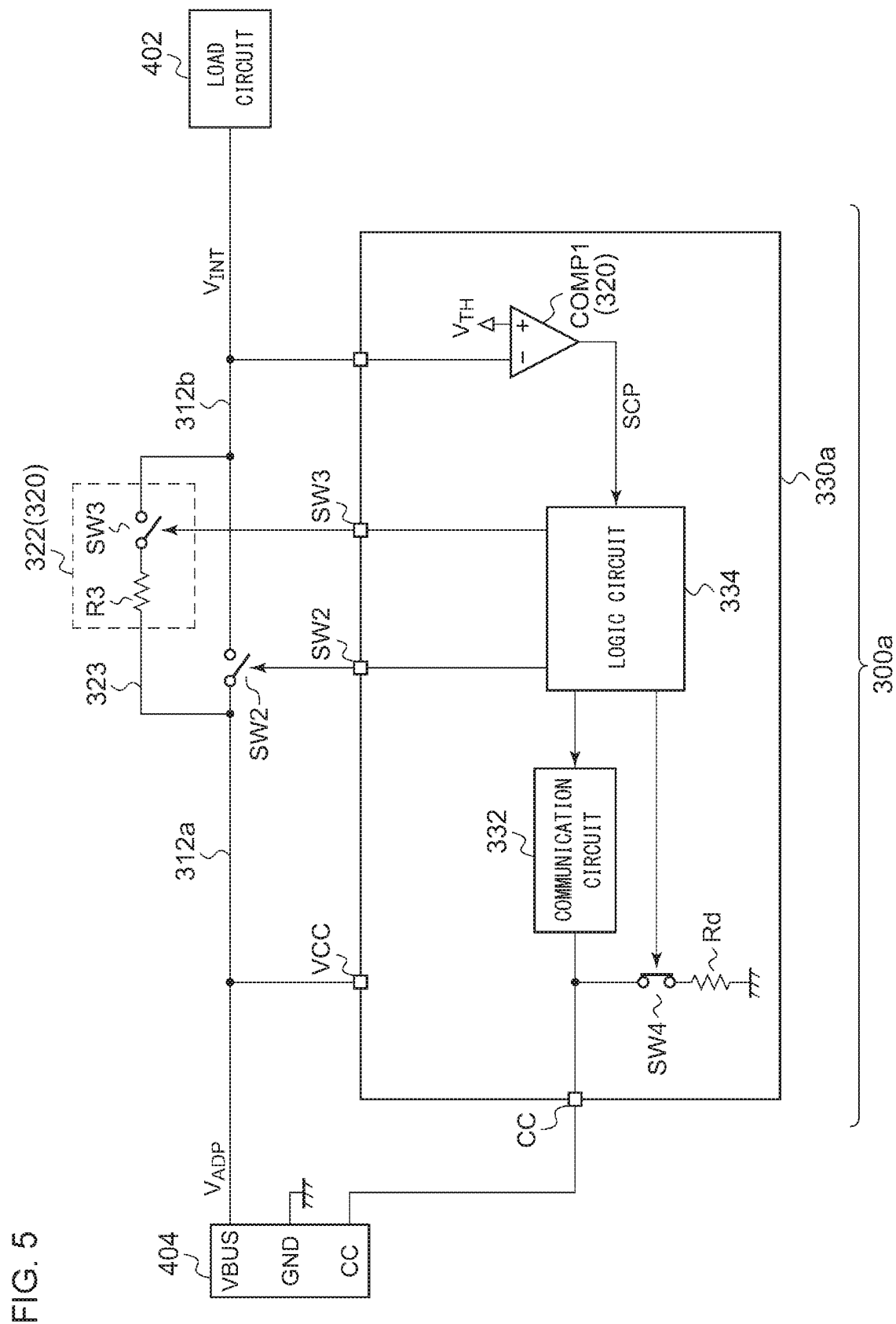
FIG. 5 is a block diagram showing a power receiving apparatus according to a first example configuration.

FIG. 5 is a block diagram showing a power receiving apparatus 300a according to a first example configuration. The power receiving apparatus 300a includes the bus switch SW2 and a control circuit 330a. The control circuit 330a is configured as a function IC obtained by integrating the power receiver side controller 310 and a part of the short circuit detection circuit 320 shown in FIG. 3.

A communication circuit 332 and a part of a logic circuit 334 correspond to the power receiver side controller 310 shown in FIG. 3. The communication circuit 332 provides a communication function with the power supply side controller 204. The logic circuit 334 determines the voltage to be supplied based on negotiation with the power supply side controller 204. Furthermore, the logic circuit 334 controls the bus switch SW2.

The short circuit detection circuit 320 includes a charger circuit 322, a comparator COMP1, and a part of the logic circuit 334. The charger circuit 322 is switchable between the on state and the off state. In the on state, the charger circuit 322 charges the second bus line 312b. The on/off state of the charger circuit 322 is controlled by the logic circuit 334.

The short circuit detection circuit 320 detects a short circuit based on the voltage (which will be referred to the "internal voltage") $V_{INT}$ that occurs on the second bus line 312b as a result of the charging operation of the charger circuit 322. The comparator COMP1 is integrated in the control circuit 330a, and is coupled to the second bus line 312b via a VS (voltage detection) terminal. The comparator COMP1 compares the voltage $V_{INT}$ on the second bus line 312b with a predetermined threshold voltage $V_{TH}$. When $V_{INT} < V_{TH}$, the comparator COMP1 asserts (set to the high level, for example) a short circuit protection (SCP) signal. The SCP signal is input to the logic circuit 334.

More specifically, the charger circuit 322 includes a charging switch SW3 and a charging resistor R3 arranged in series on a sub-path 323 arranged in parallel with the bus switch SW2. The on state of the bus switch SW2 corresponds to the on state of the charger circuit 322. The logic circuit 334 controls the on/off state of the charging switch SW3. The impedance of the charger circuit 322 is preferably designed to be higher than that of the bus switch SW2. By designing the charger circuit 322 to have a high impedance, such an arrangement prevents a large amount of current from flowing even if a short circuit has occurred. It should be noted that the charging resistor R3 may be omitted. Instead, the charging switch SW3 may be designed to have a sufficiently high impedance that matches the charging resistor R3.

The control circuit 330a includes a pull-down switch SW4 and a pull-down resistor Rd as built-in components. The pull-down switch SW4 and the pull-down resistor Rd are arranged in series between the CC port and the ground. It should be noted that, in actuality, two CC ports are provided. However, for ease of understanding, one of these CC ports is not shown. The pull-down resistor Rd and the pull-down switch SW4 may each be configured as an external chip component.

Upon detecting a short circuit by means of the short circuit detection circuit 320, the logic circuit 334 turns off the pull-down switch SW4, which sets the pull-down resistor Rd coupled to the CC port to the open state. This cancels the CC port declaration. Furthermore, upon detecting a short circuit, the logic circuit 334 fixes the bus switch SW2 to the off state.

Figure 6A:
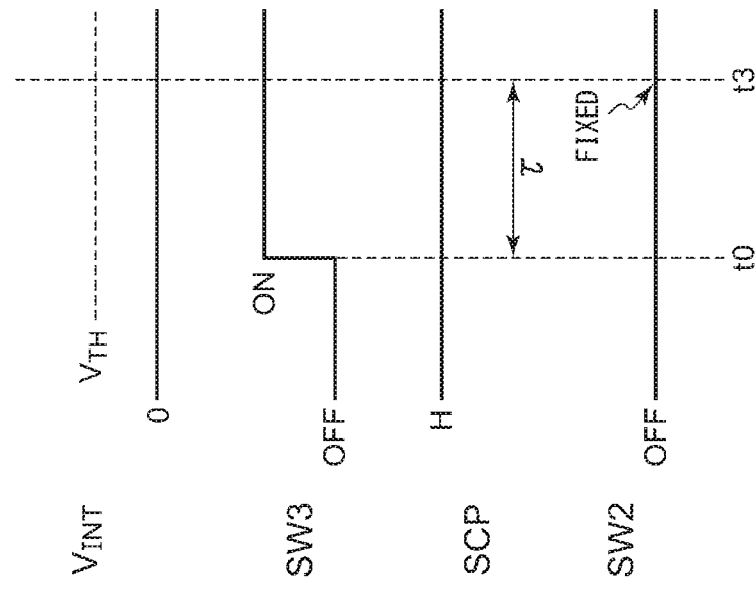
FIGS. 6A and 6B are operation waveform diagrams each showing the operation of the power receiving apparatus shown in FIG. 5.
Figure 6B:
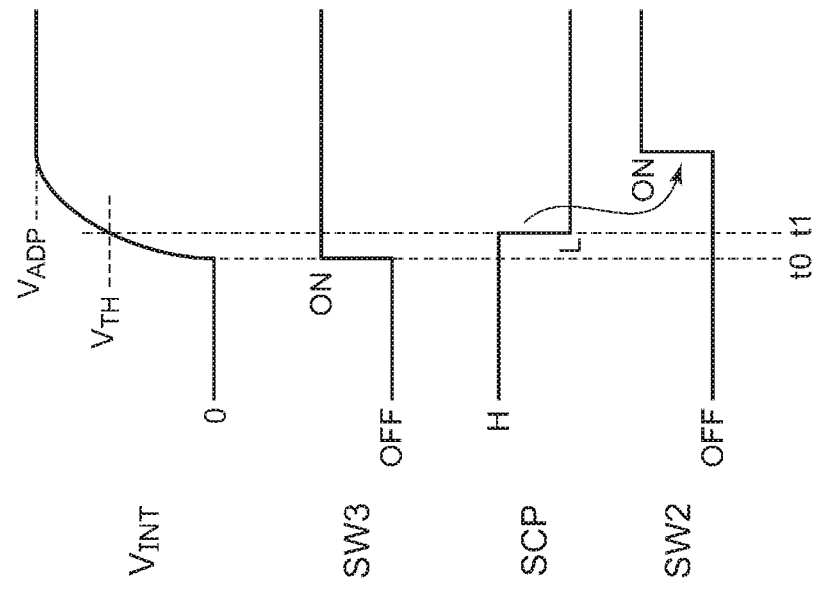

The above is the configuration of the control circuit 330a and the power receiving apparatus 300a. Next, description will be made regarding the operation thereof. FIGS. 6A and 6B are operation waveform diagrams each showing the operation of the power receiving apparatus 300a shown in FIG. 5. First, description will be made with reference to FIG. 6A regarding the operation in the normal state in which a short circuit has not occurred. When the charging switch SW3 is turned on at the time point t0, the charger circuit 322 charges the second bus line 312b, thereby increasing the internal voltage $V_{INT}$. Subsequently, when the internal voltage $V_{INT}$ exceeds the threshold voltage $V_{TH}$ at the time point t1, the SCP signal is negated. The logic circuit 334 uses negation of the SCP signal as a condition to turn on the bus switch SW2.

Next, description will be made with reference to FIG. 6B regarding the operation when there is a short circuit. When the charging switch SW3 is turned on at the time point t0, the charger circuit 322 charges the second bus line 312b. However, if the second bus line 312b is grounded via a short-circuit path, the internal voltage $V_{INT}$ does not rise, and remains lower than the threshold voltage $V_{TH}$. In this case, the assertion of the SCP signal continues. If the assertion of the SCP signal continues for a predetermined period of time τ, the logic circuit 334 fixes the bus switch SW2 to the off state.

Figure 7:
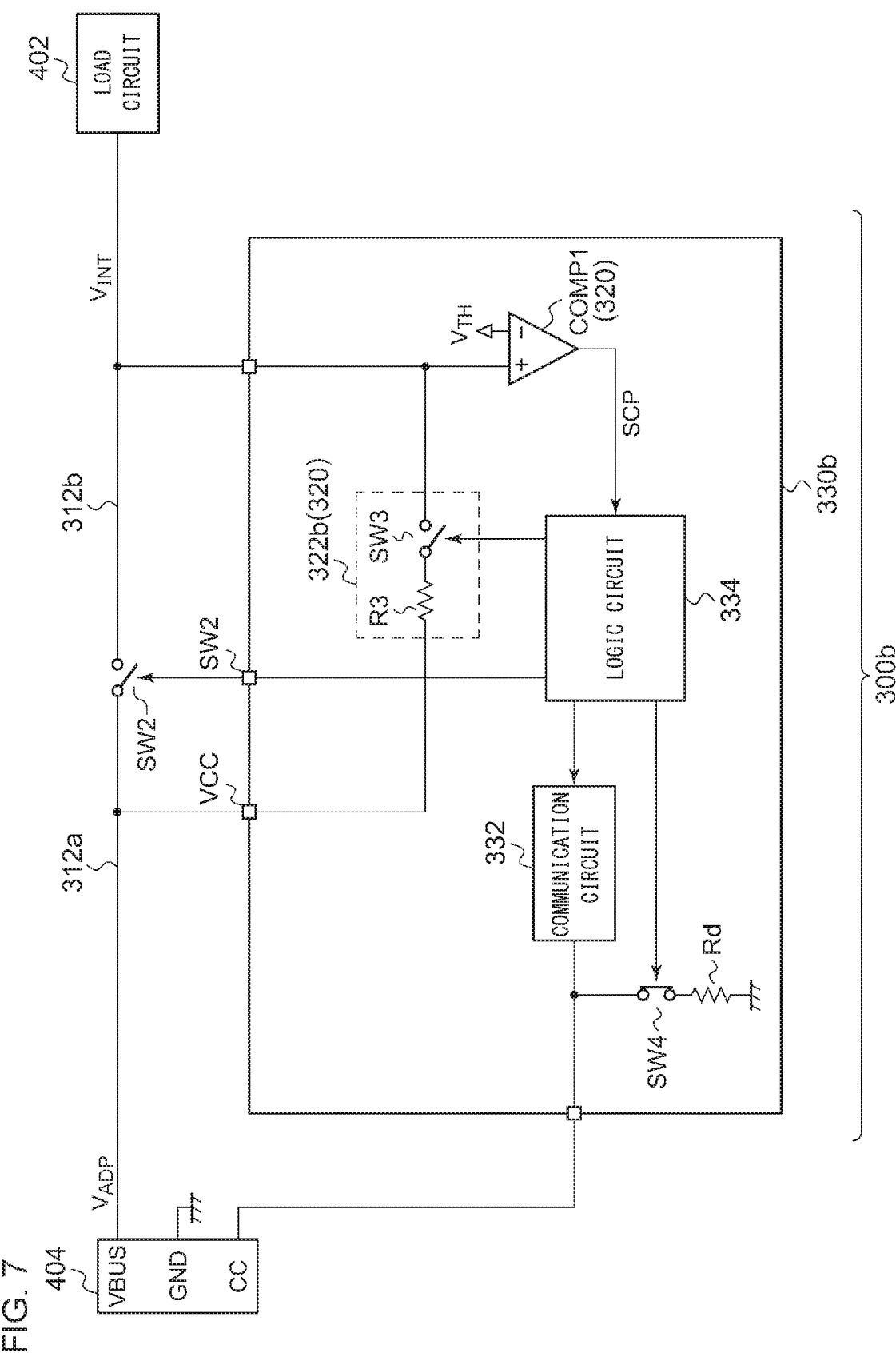
FIG. 7 is a block diagram showing a power receiving apparatus according to a second example configuration.

FIG. 7 is a block diagram showing a power receiving apparatus 300b according to a second example configuration. In the power receiving apparatus 300b, a charger circuit 322b is integrated in the control circuit 330b, and otherwise the configuration is the same as that shown in FIG. 6. By integrating the charger circuit 322b, the number of components can be reduced.

Figure 8:
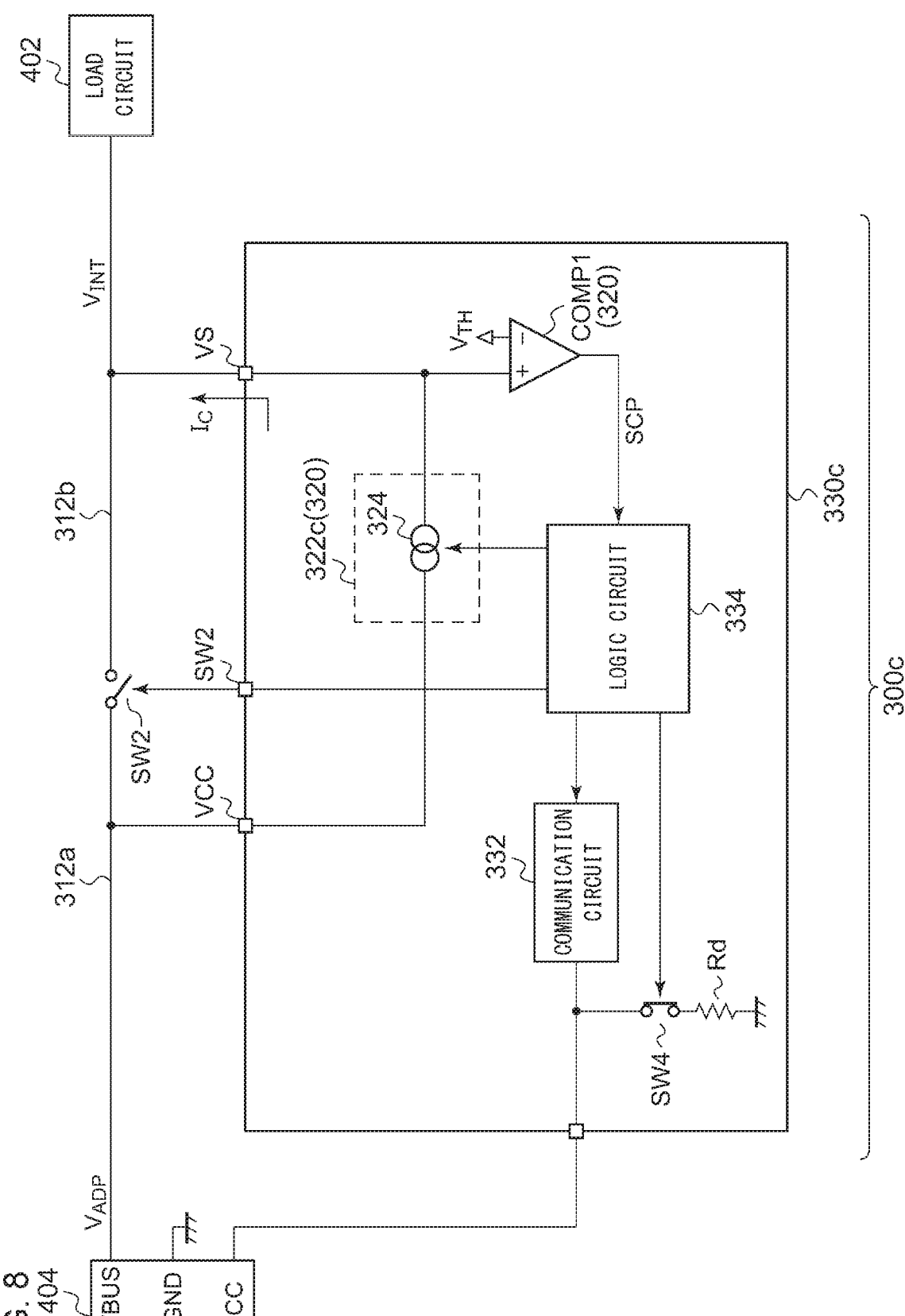
FIG. 8 is a block diagram showing a power receiving apparatus according to a third example configuration.

FIG. 8 is a block diagram showing a power receiving apparatus 300c according to a third example configuration. In the power receiving apparatus 300c, a charger circuit 322c includes a current source 324. The current source 324 is switchable between the on state and the off state according to a control operation of the logic circuit 334. In the on state, the current source 324 charges the second bus line 312b via the VS terminal. The other configuration is the same as that shown in FIG. 6. This allows the amount of current to be limited even when a short circuit has occurred. It should be noted that a part of or all the components of the current source 324 may be configured using external discrete components of the control circuit 330c in the same manner as shown in FIG. 6.

Modification

Description has been made in the embodiment regarding an arrangement in which, as shown in FIG. 4, after a notice of completion of the supply of the bus voltage $V_{BUS}$ (S108) is transmitted, short circuit detection is performed before the bus switch SW2 is turned on. However, the present invention is not restricted to such an arrangement. The short circuit detection may preferably be executed before the bus switch SW2 is turned on. Furthermore, the bus switch SW2 may preferably be turned on based on a condition that a short circuit has not been detected. For example, such short circuit detection may be performed in the negotiation.

[Usage]

Figure 9:
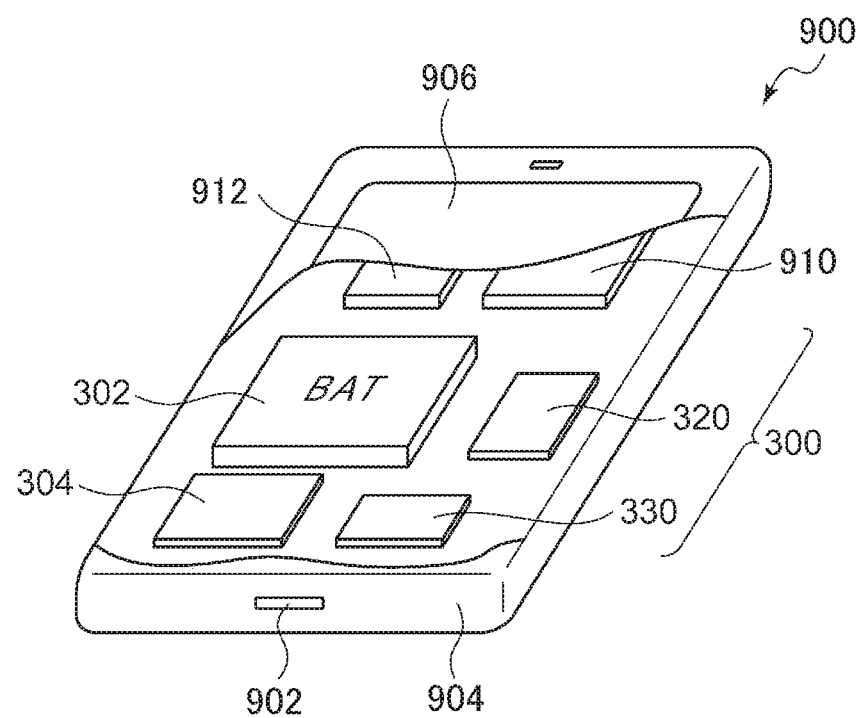
FIG. 9 is a diagram showing an electronic device including a power receiving apparatus.

Lastly, description will be made regarding the usage of the power receiving apparatus 300. FIG. 9 is a diagram showing an electronic device 900 including the power receiving apparatus 300. Examples of such an electronic device 900 include smartphones and tablet terminals. The electronic device 900 includes the aforementioned power receiving apparatus 300 in addition to a receptacle 902, a housing 904, a display panel 906, a CPU 910, and a baseband IC 912. The power receiving apparatus 300 receives the bus voltage supplied to the receptacle 902, and charges the battery 302. Furthermore, the power receiving apparatus 300 supplies the power supply voltage to loads such as the CPU 910, the baseband IC 912, and the like. It should be noted that the electronic device 900 may be configured as a laptop PC, a digital still camera, a digital video camera, an audio player, or the like. As described above, the power receiving apparatus 300 may include the charger circuit 322, the control circuit 330, the bus switch SW2 (not shown), and the like.

While the preferred embodiments of the present invention have been described using specific terms, such description is for illustrative purposes only, and it is to be understood that changes and variations may be made without departing from the spirit or scope of the appended claims.

What is claimed is:

1. A power receiving apparatus structured to receive a bus voltage from a power supply apparatus via a cable, and to supply the bus voltage to a load circuit, the power receiving apparatus comprising:
   a bus line structured to extend from a receptacle, into which the cable is to be inserted, to the load circuit;
   a bus switch arranged on a path of the bus line;
   a power receiver side controller structured to receive, as a power supply, a voltage on the bus line that is more toward the receptacle than the bus switch, to communicate with a power supply side controller of the power supply apparatus, to determine a voltage to be supplied based on a negotiation, and to control the bus switch; and
   a short circuit detection circuit structured to detect a short circuit of the bus line that is more toward the load circuit than the bus switch during an off state of the bus switch.

2. The power receiving apparatus according to claim 1, wherein the short circuit detection circuit is structured to be switchable between an on state and an off state,
   wherein the short circuit detection circuit comprises a charger circuit structured to charge the bus line that is more toward the load circuit than the bus to an internal voltage in the on state,
   and wherein the short circuit detection circuit is structured to detect a short circuit based on the internal voltage.

3. The power receiving apparatus according to claim 2, wherein the charger circuit comprises a charging switch arranged on a sub-path arranged in parallel with the bus switch,
   and wherein the charger circuit has an impedance that is higher than that of the bus switch.

4. The power receiving apparatus according to claim 3, wherein the charger circuit further comprises a charging resistor arranged on the sub-path such that it is coupled in series with the charging switch.

5. The power receiving apparatus according to claim 2, wherein the charger circuit comprises a current source.

6. The power receiving apparatus according to claim 1, wherein the short circuit detection circuit comprises a comparator structured to compare the internal voltage with a predetermined threshold voltage.

7. The power receiving apparatus according to claim 1, structured to be compatible with the USB-PD specification.

8. The power receiving apparatus according to claim 1, structured to be compatible with the USB Type-C specification,
   wherein the power receiver side controller is structured to set a pull-down resistor coupled to a CC (Configuration Channel) port to an open state when the short circuit detection circuit detects a short circuit.

9. The power receiving apparatus according to claim 1, wherein, when the short circuit detection circuit detects a short circuit, the power receiver side controller fixes the bus switch to the off state.

10. An electronic device comprising the power receiving apparatus according to claim 1.

11. A control circuit structured to be employed in a power receiving apparatus structured to receive a bus voltage from a power supply apparatus via a cable, and to supply the bus voltage to a load circuit, wherein, in addition to the control circuit, the power receiving apparatus comprises:
   a bus line structured to extend from a receptacle, into which the cable is to be inserted, to the load circuit; and
   a bus switch arranged on a path of the bus line,
   and wherein the control circuit comprises:
      a communication circuit structured to communicate with a power supply side controller of the power supply apparatus;
      a logic circuit structured to determine a voltage to be supplied, based on a negotiation with the power supply side controller, and to control the bus switch; and
      a short circuit detection circuit structured to detect a short circuit of the bus line that is more toward the load circuit than the bus switch in a state in which the logic circuit has the bus switch turned off.

12. The control circuit according to claim 11, wherein the power receiving apparatus further comprises a charger circuit structured to be switchable between an on state and an off state, and to charge the bus line that is more toward the load circuit side than the bus switch in the on state,
   and wherein the short circuit detection circuit is structured to detect a short circuit of the bus line based on a voltage on the bus line in the on state of the charger circuit.

13. The control circuit according to claim 12, wherein the charger circuit comprises a charging switch arranged on a sub-path arranged in parallel with the bus switch,
   and wherein the charger circuit is structured to have an impedance that is higher than that of the bus switch.

14. The control circuit according to claim 13, wherein the charger circuit further comprises a charging resistor arranged on the sub-path such that it is coupled in series with the charging switch.

15. The control circuit according to claim 12, wherein the charger circuit comprises a current source.

16. The control circuit according to claim 11, wherein the short circuit detection circuit comprises a comparator structured to compare the voltage on the bus line with a predetermined threshold voltage.

17. The control circuit according to claim 11, structured to be compatible with the USB-PD specification.

18. The control circuit according to claim 11, structured to compatible with the USB Type-C specification,
   wherein the control circuit is structured to set a pull-down resistor coupled to a CC (Configuration Channel) port to an open state when the short circuit detection circuit detects a short circuit.

19. The control circuit according to claim 11, wherein, when the short circuit detection circuit detects a short circuit, the control circuit fixes the bus switch to the off state.

20. An operating method for a power supply system that is compatible with the USB-PD specification, wherein the power supply system comprises a power supply apparatus and a power receiving apparatus,
   wherein the power receiving apparatus comprises:
      a bus line structured to extend from a receptacle, into which a cable is to be inserted, to a load circuit; and
      a bus switch arranged on a path of the bus line,
   and wherein the operating method comprises:
      determining a bus voltage based on a negotiation between the power supply apparatus and the power receiving apparatus;
      supplying, by means of the power supply apparatus, the bus voltage thus determined based on the negotiation to the power receiving apparatus;
      transmitting, by means of the power supply apparatus, a notice of the supplying of the bus voltage;
      detecting, by means of the power receiving apparatus, a short circuit on a side that is more toward the load circuit than the bus switch in response to the notice before the bus switch is turned on; and turning on the bus switch under a condition of non-detection of a short circuit.

\* \* \* \* \*